P. Crosby,
Sharpening Reciprocating Saws.

Nº 26,838. Patented Jan. 17, 1860.

Witnesses:
Mich' Hughes
Charles M. Hughes

Inventor:
Pearson Crosby

UNITED STATES PATENT OFFICE.

PEARSON CROSBY, OF NEW YORK, N. Y.

FILING SAWS.

Specification of Letters Patent No. 26,838, dated January 17, 1860.

*To all whom it may concern:*

Be it known that I, PEARSON CROSBY, of the city, county, and State of New York, have invented a new and useful Improvement for Evening the Set of Saws and Improving the Cutting Action Thereof; and I do hereby declare the following is a full, clear, and exact description of the same, reference being had to the annexed drawings, making a part of this specification, in which—

Figure 1:
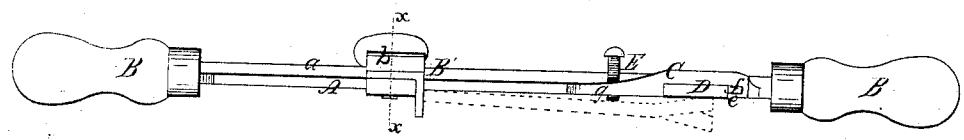
Figure 2:
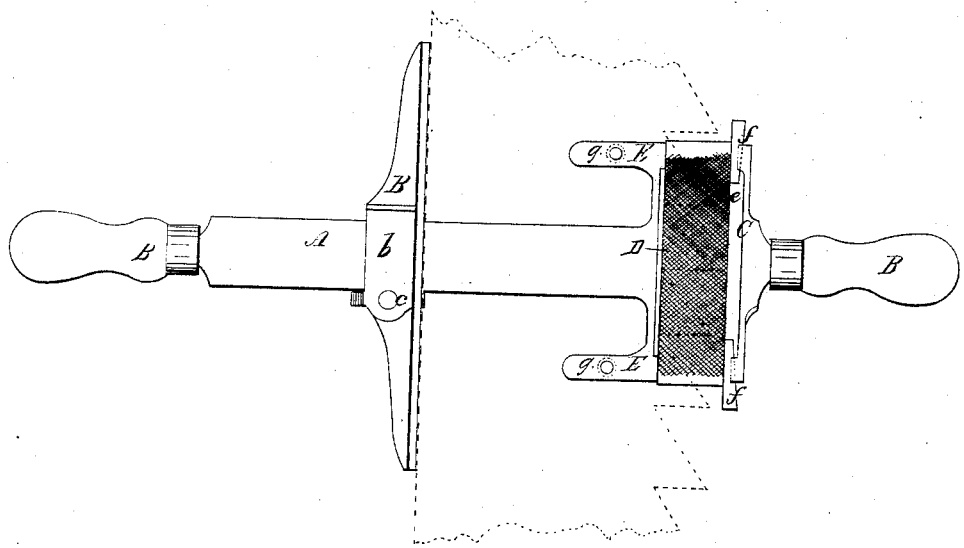
Figure 3:
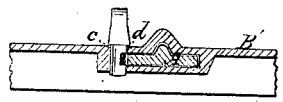

Figure 1, is a side view of my invention; Fig. 2, a face view of ditto; Fig. 3, a transverse section of ditto taken in the line $x$, $x$, Fig. 1.

Similar letters of reference indicate corresponding parts in the several figures.

This invention consists in the employment or use of a bar provided with an adjustable slide, a stationary clamp or holder in which a file is secured and adjusting or gage screws; the parts being arranged substantially as hereinafter described, whereby the sides of the teeth of the saw may be filed so as to form a "set" of equal width throughout the whole length of the saw and also to render the cutting action of the saw far more efficient than hitherto.

To enable those skilled in the art to fully understand and construct my invention I will proceed to describe it.

A, represents a metal bar of a suitable length and provided at each end with a handle B. This bar may be provided at its back or outer side with a longitudinal rib $a$, to impart strength or stiffness to the bar.

On the bar A, a slide B′, is fitted at right angles with bar A. The slide B′, is simply a metal bar having an eye $b$, at its center through which the bar $A^3$ passes sufficiently loose to permit the slide to move freely on the bar. This slide has an eccentric $c$, fitted in it, said eccentric being in contact with a short bar $d$, which, when necessary, is pressed against the side of bar A, by turning the eccentric and thereby secures the slide at any desired point on bar A, see Fig. 3. At one end of the bar A, there is a transverse plate or projection C, formed. This plate or projection extends both sides of the bar A, said plate or projection has a groove or recess $e$, made in it to receive a flat file D, which is secured in the recess by keys $f$, or other proper means. At each end of the plate or projection C, there is a right-angular projection $g$. These projections are parallel with each other and with the bar A, as shown clearly in Fig. 2. Through each projection $g$, a set screw E, passes.

The implement is used as follows:—The face or smooth side of the bar A, is placed on or over one side of the saw which is shown in red outline and the set screws E, E, are so adjusted that the sides of the teeth of the saw may have a greater or less oblique position with the file D, as may be desired. It will be seen by referring to Fig. 1, that if the set-screws are not projected much below or through the projections $g$, the saw will be nearly parallel with the bar A, but if projected far through the projections the saw will have a decidedly oblique position relatively with the bar.— By adjusting therefore the set screws E, E, and shoving the bar A, back and forth the sides of the teeth of the saw will be filed and a greater or less portion of the side of each tooth removed according as the set screws are adjusted. The slide B′, is adjusted on the bar A, so as to keep the teeth of the saw on the file, said slide serving as a guide to the saw and bearing against its back edge. When the teeth are filed at one side of the saw, the implement is adjusted to the other side and moved back and forth as before. The teeth therefore, it will be seen are filed at both sides of the saw and the "set" of the teeth will be made even from one end of the saw to the other. This filing of the sides of the teeth at both sides of the saw not only makes the "set" even, but it also increases the cutting portions of the teeth, giving them a cutting edge at each side equivalent in length to the width of the portions removed from the sides of the teeth as indicated by the black dotted parts on the red lines in Fig. 2.

Having thus described my invention what I claim as new and desire to secure by Letters Patent, is,

The bar A, provided with the slide B′, transverse plate or file-holder C, provided with the file D, and the set screws E, E, or their equivalents, to form a new and useful implement for the purpose set forth.

PEARSON CROSBY.

Witnesses:
CHARLES M. HUGHES,
MICH. HUGHES.